United States Patent
Donahue et al.

(10) Patent No.: US 9,845,765 B2
(45) Date of Patent: Dec. 19, 2017

(54) PISTON ASSEMBLY FOR A RECIPROCATING ENGINE

(71) Applicant: GENERAL ELECTRIC COMPANY, Schenectady, NY (US)

(72) Inventors: Richard John Donahue, West Bend, WI (US); Daniel David Zimmerman, Waterford, WI (US)

(73) Assignee: General Electric Company, Schenectady, NY (US)

( * ) Notice: Subject to any disclaimer, the term of this patent is extended or adjusted under 35 U.S.C. 154(b) by 243 days.

(21) Appl. No.: 14/595,013

(22) Filed: Jan. 12, 2015

(65) Prior Publication Data

US 2016/0201597 A1     Jul. 14, 2016

(51) Int. Cl.
| | | |
|---|---|---|
| F02F 3/24 | (2006.01) |
| F02F 3/28 | (2006.01) |
| F02F 3/00 | (2006.01) |
| F02F 3/08 | (2006.01) |
| F16J 9/08 | (2006.01) |

(52) U.S. Cl.
CPC .......... *F02F 3/0092* (2013.01); *F02F 3/0084* (2013.01); *F02F 3/08* (2013.01); *F02F 3/24* (2013.01); *F02F 3/285* (2013.01); *F16J 9/08* (2013.01)

(58) Field of Classification Search
CPC .......... F02F 3/24; F02F 3/0092; F02F 3/0084; F02F 3/08; F02F 3/28; F02F 3/285; F16J 9/08
See application file for complete search history.

(56) References Cited

U.S. PATENT DOCUMENTS

| | | |
|---|---|---|
| 1,467,256 A | 9/1923 | Thomson |
| 1,815,418 A | 7/1931 | O'Bryan |
| 1,822,101 A | 9/1931 | Lewis |
| 1,936,430 A | 1/1933 | Godron |
| 1,959,566 A | 5/1934 | Brubaker |
| 2,233,723 A | 3/1941 | Ballard |
| 2,328,912 A | 9/1943 | Kotzback |
| 2,566,603 A | 9/1951 | Dykes |

(Continued)

FOREIGN PATENT DOCUMENTS

| | | |
|---|---|---|
| DE | 102005061074 A1 | 6/2007 |
| DE | 102008014859 A1 | 10/2009 |

(Continued)

OTHER PUBLICATIONS

Longhui Shen et al., filed Aug. 28, 2014, U.S. Appl. No. 14/470,968.

(Continued)

*Primary Examiner* — Jacob Amick
(74) *Attorney, Agent, or Firm* — Fletcher Yoder, P.C.

(57) ABSTRACT

A power cylinder system for a reciprocating engine includes a steel piston configured to move within a cylinder of the reciprocating engine. The system also includes a groove extending circumferentially about the piston beneath a top land of the piston and configured to support a ring having an inner circumferential face. One or more channels are formed in the top land and are configured to facilitate transfer of combustion gases to a space between a portion of the groove and the inner circumferential face of the ring.

16 Claims, 4 Drawing Sheets

(56) References Cited

U.S. PATENT DOCUMENTS

| | | | |
|---|---|---|---|
| 2,591,176 A | 4/1952 | Mason | |
| 2,610,098 A | 9/1952 | Reiners | |
| 2,892,645 A | 6/1959 | Tydeman | |
| 2,914,368 A | 11/1959 | Farmer et al. | |
| 3,033,578 A | 5/1962 | Kellogg | |
| 3,364,675 A | 1/1968 | Dorer | |
| 3,396,976 A | 8/1968 | Reinhoudt et al. | |
| 3,554,564 A | 1/1971 | Lassanske | |
| 3,608,911 A | 9/1971 | Prasse et al. | |
| 3,667,443 A | 6/1972 | Currie et al. | |
| 3,806,137 A | 4/1974 | Prasse et al. | |
| 4,154,207 A | 5/1979 | Brehob | |
| 4,235,447 A | 11/1980 | Davison, Jr. | |
| 4,358,121 A | 11/1982 | Sand | |
| RE32,395 E | 4/1987 | Geffroy et al. | |
| 4,669,369 A | 6/1987 | Holt et al. | |
| 4,681,326 A | 7/1987 | Kubo | |
| 4,736,586 A | 4/1988 | Kawajiri et al. | |
| 4,836,093 A | 6/1989 | Wagner | |
| 4,848,212 A | 7/1989 | Kawano et al. | |
| 5,083,536 A * | 1/1992 | Ariga | F16J 9/08 |
| | | | 123/193.6 |
| 5,133,563 A | 7/1992 | Casellato | |
| 5,253,877 A * | 10/1993 | DeBiasse | F16J 9/06 |
| | | | 277/437 |
| 5,285,755 A | 2/1994 | Regueiro | |
| 5,392,692 A | 2/1995 | Rao et al. | |
| 5,430,938 A | 7/1995 | Rao et al. | |
| 5,474,307 A | 12/1995 | DeBiasse | |
| 5,490,445 A | 2/1996 | Rao et al. | |
| 5,517,379 A | 5/1996 | Williams et al. | |
| 5,564,699 A | 10/1996 | Lawrence et al. | |
| 5,737,999 A | 4/1998 | Ariga | |
| 5,779,243 A | 7/1998 | Hanlon | |
| 6,131,503 A | 10/2000 | Takashima | |
| 6,213,474 B1 | 4/2001 | Sameshima et al. | |
| 6,378,482 B2 | 4/2002 | Marcil | |
| 6,536,385 B1 | 3/2003 | Takashima | |
| 7,068,011 B2 | 6/2006 | Yang | |
| 7,207,571 B2 | 4/2007 | Yoshida et al. | |
| 7,312,653 B2 | 12/2007 | Chen et al. | |
| 7,493,883 B2 | 2/2009 | Takahashi | |
| 7,642,748 B2 | 1/2010 | Glosser, Jr. et al. | |
| 7,730,866 B2 | 6/2010 | Melchior | |
| 7,740,448 B2 | 6/2010 | Meyer et al. | |
| 7,854,191 B2 | 12/2010 | Kariya | |
| 8,001,946 B2 | 8/2011 | Leitl | |
| 8,820,288 B2 * | 9/2014 | Kaiser | B21K 1/18 |
| | | | 123/193.6 |
| 2002/0158609 A1 | 10/2002 | Lavington et al. | |
| 2004/0094902 A1 | 5/2004 | Brunke | |
| 2004/0134457 A1 | 7/2004 | Evans | |
| 2006/0278180 A1 * | 12/2006 | Scharp | F02F 3/0023 |
| | | | 123/41.35 |
| 2008/0053396 A1 | 3/2008 | Hiraishi et al. | |

FOREIGN PATENT DOCUMENTS

| | | |
|---|---|---|
| DE | 102010045221 A1 | 3/2012 |
| EP | 1248022 A2 | 10/2002 |
| EP | 2551503 A1 | 1/2013 |
| FR | 1304041 A | 9/1962 |
| GB | 1042090 A | 9/1966 |
| JP | 56110541 A | 9/1981 |
| JP | 6124876 A | 2/1986 |
| JP | 2001336447 A | 12/2001 |
| JP | 2009243357 A | 10/2009 |
| NL | 39704 C | 7/1936 |
| WO | 9730277 | 8/1997 |

OTHER PUBLICATIONS

Richard John Donahue, filed Aug. 5, 2014, U.S. Appl. No. 14/452,509.
Richard John Donahue, filed Jun. 6, 2014, U.S. Appl. No. 14/298,867.
Richard John Donahue, filed Jun. 6, 2014, U.S. Appl. No. 14/298,869.
Richard John Donahue, filed Aug. 5, 2014, U.S. Appl. No. 14/452,515.
European Search Report and Opinion issued in connection with related EP Application No. 15169854.5 dated Nov. 6, 2015.
European Search Report and Opinion issued in connection with related EP Application No. 15179639.8 dated Dec. 17, 2015.
European Search Report and Opinion issued in connection with related EP Application No. 15179641.4 dated Dec. 17, 2015.
U.S. Non-Final Office Action issued in connection with Related U.S. Appl. No. 14/452,509 dated Feb. 1, 2016.
U.S. Non-Final Office Action issued in connection with Related U.S. Appl. No. 14/452,515 dated Feb. 25, 2016.
European Search Report and Opinion issued in connection with corresponding EP Application No. 16150208.3 dated Mar. 31, 2016.
Dykes, "Pressure-Backed Piston Rings, Passage", Pressure-Backed Piston Rings, pp. 2-22, Dec. 1, 1951.
European Search Report and Opinion issued in connection with corresponding EP Application No. 15170678.5 dated Aug. 7, 2015.
European Search Report and Opinion issued in connection with corresponding EP Application No. 15170677.7 dated Aug. 7, 2015.
U.S. Appl. No. 14/298,864, filed Jun. 6, 2014, Donahue.
U.S. Appl. No. 14/298,867, filed Jun. 6, 2014, Donahue.
U.S. Appl. No. 14/298,869, filed Jun. 6, 2014, Donahue.
U.S. Appl. No. 14/452,515, filed Aug. 5, 2014, Donahue.
U.S. Appl. No. 14/452,509, filed Aug. 5, 2014, Donahue.

* cited by examiner

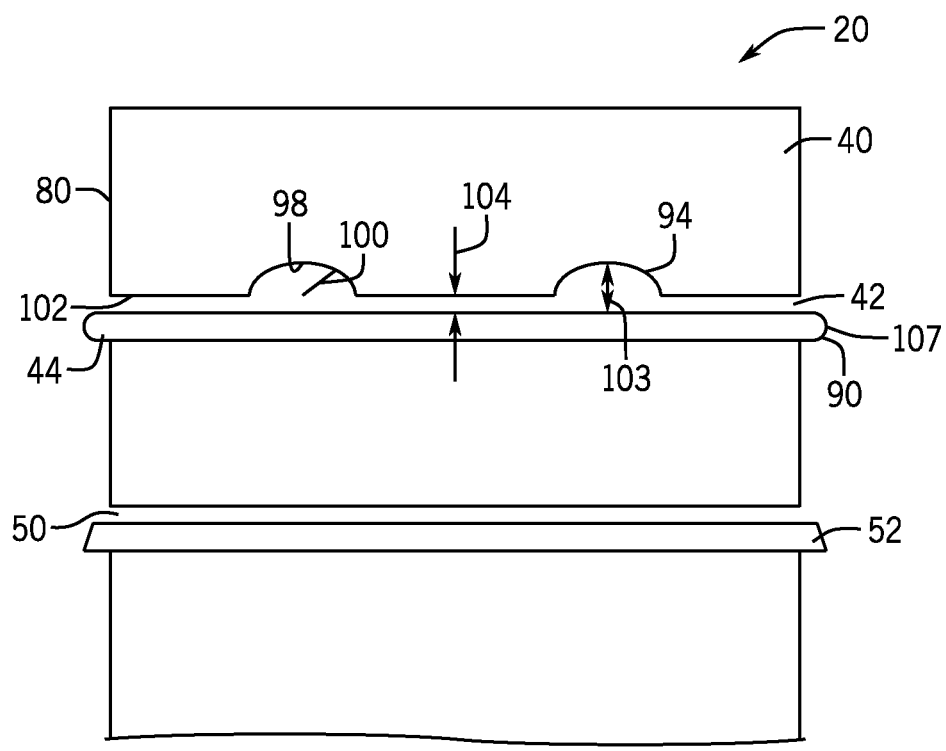
FIG. 3
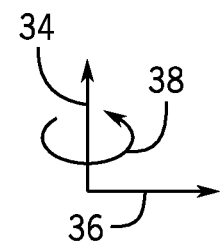

US 9,845,765 B2

PISTON ASSEMBLY FOR A RECIPROCATING ENGINE

BACKGROUND

The subject matter disclosed herein relates generally to reciprocating engines, and, more particularly to a piston assembly for a reciprocating engine.

A reciprocating engine (e.g., a reciprocating internal combustion engine) combusts fuel with an oxidant (e.g., air) to generate hot combustion gases, which in turn drive a piston (e.g., a reciprocating piston) within a cylinder. In particular, the hot combustion gases expand and exert a pressure against the piston that linearly moves the piston from a top portion to a bottom portion of the cylinder during an expansion stroke. The piston converts the pressure exerted by the combustion gases and the piston's linear motion into a rotating motion (e.g., via a connecting rod and a crankshaft coupled to the piston) that drives one or more loads, e.g., an electrical generator. The construction of the piston and associated structures (e.g., a piston assembly) can significantly impact exhaust emissions (e.g., unburned hydrocarbons) and engine efficiency, as well as lubricant (e.g., oil) consumption. Furthermore, the construction of the piston assembly can significantly affect the operating life of the reciprocating engine. Therefore, it would be desirable to improve the construction of the piston assembly.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a power cylinder system for a reciprocating engine includes a steel piston configured to move within a cylinder of the reciprocating engine. The system also includes a groove extending circumferentially about the piston beneath a top land of the piston and configured to support a ring having an inner circumferential face. One or more channels are formed in the top land and are configured to facilitate transfer of combustion gases to a space between a portion of the groove and the inner circumferential face of the ring.

In one embodiment, a power cylinder system for a reciprocating engine includes a piston configured to move within a cylinder of the reciprocating engine. The system also includes a groove extending circumferentially about the piston beneath a top land of the piston, and a protective ring insert disposed within the groove is configured to support a ring having an inner circumferential face. One or more channels are formed in the protective ring insert are configured to facilitate transfer of combustion gases to a space between a portion of the groove and the inner circumferential face of the ring.

In one embodiment, a power cylinder system for a reciprocating engine includes a piston configured to move within a cylinder of the reciprocating engine with a maximum mean piston speed of less than approximately thirteen meters per second. The system also includes a groove extending circumferentially about the piston beneath a top land of the piston and a ring disposed within the groove. One or more channels are formed in an axially upper surface of the groove or an upper face of the ring, and the one or more channels are configured to facilitate transfer of combustion gases to a space between a portion of the groove and an inner circumferential face of the ring.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a side view of a portion of an embodiment of a piston having radial channels formed in a top land of the piston;

DETAILED DESCRIPTION

Figure 1:
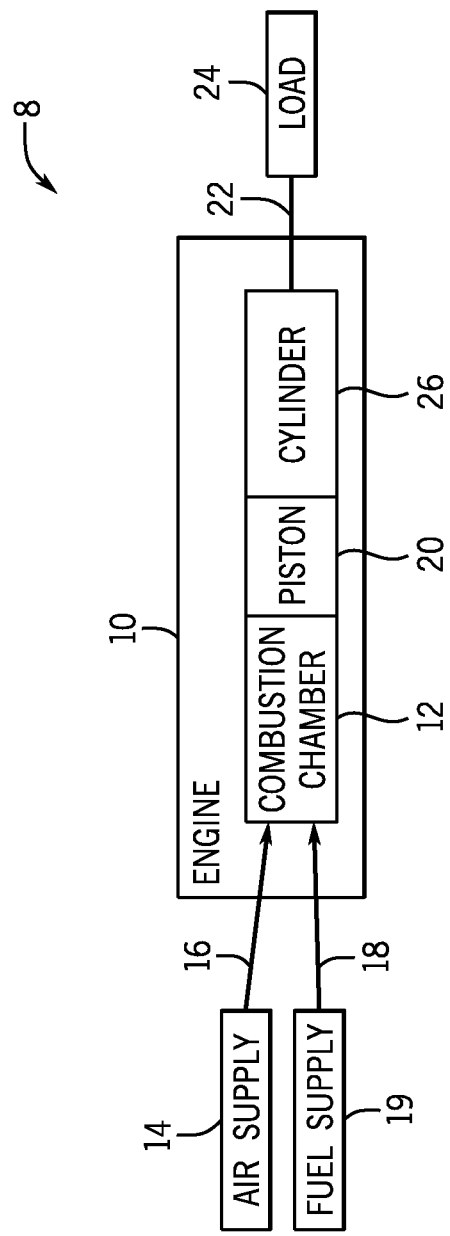
FIG. 1 is a schematic block diagram of an embodiment of a portion of a reciprocating engine system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Power cylinder systems for reciprocating engines (e.g., reciprocating internal combustion engines) in accordance with the present disclosure may include one or more pistons each configured to move linearly within a cylinder (e.g., a liner) to convert pressure exerted by combustion gases and the piston's linear motion into a rotating motion to power one or more loads. Each piston may have a top annular groove (e.g., a top ring groove or a top-most ring groove) extending circumferentially about the piston beneath a top land of a piston. A top ring (e.g., a top piston ring or a top-most ring) may be disposed within the top groove. The top ring may be generally configured to block fuel and air, or a fuel-air mixture, from escaping from a combustion chamber and/or to facilitate maintenance of suitable pressure to enable expanding hot combustion gases to cause the reciprocating motion of the piston. In some embodiments, one or more additional annular grooves (e.g., additional ring grooves or additional compression ring grooves) may extend circumferentially about the piston, and one or more additional rings (e.g., additional rings or additional compression rings) may be disposed within the one or more additional ring grooves. In such cases, the top ring and/or the additional rings form a ring pack and may generally control flow of combustion gases and/or lubricant (e.g., oil) within the engine.

During operation of the reciprocating engine, fuel and air combust in a combustion chamber, causing the piston to move within the cylinder. The combustion gases also exert a pressure against an outer circumferential face of the top ring, driving the top ring radially inward away from the inner wall of the cylinder. The disclosed embodiments may include one or more channels (e.g., radial channels) configured to transfer the combustion gases to a space adjacent to an inner circumferential face of the top ring, such that the combustion gases exert a radially outward directed force on the inner circumferential face of the top ring. Advantageously, the one or more channels may also facilitate oil control within the cylinder, which may be particularly useful in the context of large industrial reciprocating engines. For example, without the one or more channels, oil may accumulate in the top groove between an axial surface of the top groove and a top surface of the top ring and may block (e.g., by means of adhesion of the oil to the top groove) the flow of the combustion gases to the space. In the disclosed embodiments, the one or more channels may enable oil to escape from the top groove (e.g., into the combustion chamber or along the inner wall of the cylinder), thereby facilitating flow of oil out of the top groove and/or reducing residence time of oil within the top groove. Additionally, facilitating flow of oil out of the top groove may enable reliable transfer of the combustion gases to the space adjacent to the inner circumferential face of the top ring, which may generally reduce oil consumption and blowby within the engine. By way of another example, the one or more channels may enable the top ring to maintain contact with the inner wall of the cylinder, and therefore, may enable the top ring to scrape oil along the inner wall of the cylinder. Thus, the disclosed embodiments may block radial ring collapse (e.g., movement of the top ring away from the inner wall of the cylinder), reduce oil consumption, reduce blowby of unburned hydrocarbons, reduce emissions, and/or reduce wear on the components of the engine, for example.

Turning to the drawings, FIG. 1 illustrates a block diagram of an embodiment of a portion of an engine driven power generation system 8. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12). An air supply 14 is configured to provide a pressurized oxidant 16, such as air, oxygen, oxygen-enriched air, oxygen-reduced air, or any combination thereof, to each combustion chamber 14. The combustion chamber 14 is also configured to receive a fuel 18 (e.g., a liquid and/or gaseous fuel) from a fuel supply 19, and a fuel-air mixture ignites and combusts within each combustion chamber 14. The hot pressurized combustion gases cause a piston 20 adjacent to each combustion chamber 14 to move linearly within a cylinder 26 and convert pressure exerted by the gases into a rotating motion, which causes a shaft 22 to rotate. Further, the shaft 22 may be coupled to a load 24, which is powered via rotation of the shaft 22. For example, the load 24 may be any suitable device that may generate power via the rotational output of the system 10, such as an electrical generator. Additionally, although the following discussion refers to air as the oxidant 16, any suitable oxidant may be used with the disclosed embodiments. Similarly, the fuel 18 may be any suitable liquid fuel, such as diesel or gasoline, or any suitable gaseous fuel, such as natural gas, associated petroleum gas, propane, biogas, sewage gas, landfill gas, coal mine gas, for example.

The system 8 disclosed herein may be adapted for use in stationary applications (e.g., in industrial power generating engines) or in mobile applications (e.g., in cars or aircraft), although the system 8 may be particularly useful for controlling the flow of combustion gases and oil in large industrial power generating engines. The engine 10 may be a two-stroke engine, three-stroke engine, four-stroke engine, five-stroke engine, or six-stroke engine. The engine 10 may also include any number of combustion chambers 12, pistons 20, and associated cylinders (e.g., 1-24). For example, in certain embodiments, the system 8 may include a large-scale industrial reciprocating engine having 4, 6, 8, 10, 16, 24 or more pistons 20 reciprocating in cylinders. In some such cases, the cylinders and/or the pistons 20 may have a diameter of between approximately 13.5-34 centimeters (cm). In some embodiments, the cylinders and/or the pistons 20 may have a diameter of between approximately 10-50 cm, 15-30 cm, or 15-20 cm. In some embodiments, the cylinders and/or the pistons 20 may have a diameter greater than approximately 10 cm, 15 cm, 20 cm, 25 cm, 30 cm, 35 cm, or 40 cm. The system 8 may generate power ranging from 10 kilowatts (kW) to 10 Megawatts (MW). In some embodiments, the engine 10 may be configured to operate at a maximum revolutions per minute (RPM) of approximately 1800 RPM. In some embodiments, the engine 10 may be configured to operate at a maximum of approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. Furthermore, in some embodiments, the piston 20 may have a generally low maximum mean piston speed (e.g., relative to automobile engines or the like). For example, the piston 20 may have a maximum mean piston speed of less than 25 meters per second (m/s), 20 m/s, 19 m/s, 18 m/s, 17 m/s, 16 m/s, 15 m/s, 14 m/s, 13 m/s, 12 m/s, 11 m/s, 10 m/s, 9 m/s, 8 m/s, 7 m/s, 6 m/s, or 5 m/s. In some embodiments, the piston 20 may have a maximum mean piston speed of between approximately 1 to 25 m/s, 5 to 20 m/s, 10 to 20 m/s, 10 to 16 m/s, 13 to 15 m/s, or 11 to 12 m/s. In some embodiments, the piston 20 may have a maximum mean piston speed of approximately 12 m/s. The mean piston speed is an average speed of the piston 20 in the engine 10 and is a function of stroke and RPM. For example, the mean piston speed (MPS) may be equal to $(2 \times S) \times (RPM/60)$, where S is the stroke (e.g., a length of the stroke) and RPM is the revolutions per minute at which the engine 10 operates. In the above equation, the stroke is multiplied by a factor of 2 to account for the fact that two strokes occur per one crank revolution, and the RPM may be divided by a factor of 60 to convert minutes to seconds. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example. As discussed in more detail below, the piston 20 may be a steel piston or an aluminum piston. In certain embodiments, the piston 20 may include a protective ring insert (e.g., a Ni-resist ring insert) in a ring groove of the piston 20. Furthermore, the piston 20 may include one or more radial channels formed in the ring groove and/or in the protective ring insert, for example.

Figure 2:
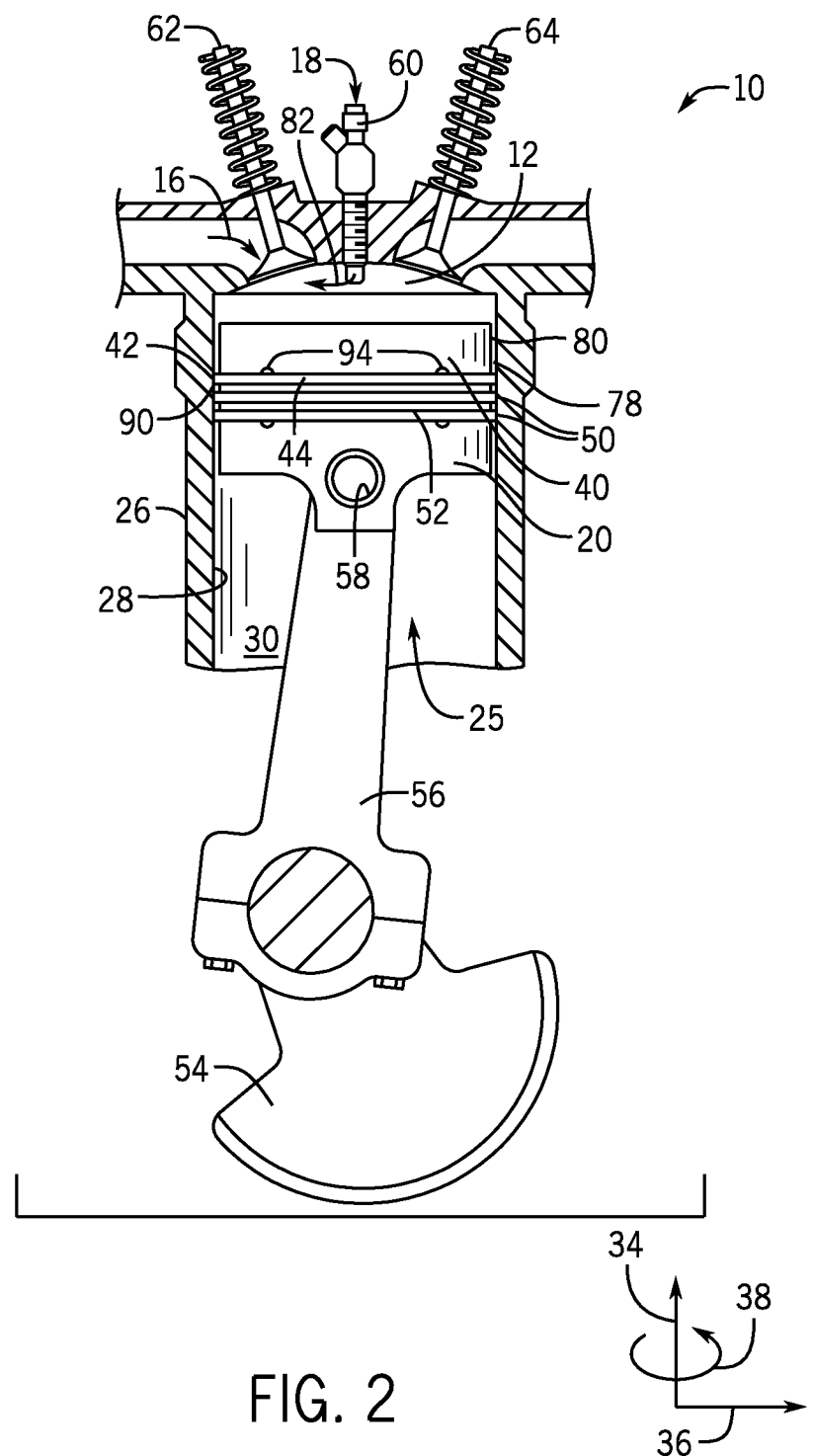
FIG. 2 is a cross-sectional side view of an embodiment of a piston-cylinder assembly having a piston positioned within a cylinder.

FIG. 2 is a side cross-sectional view of an embodiment of a piston assembly 25 having the piston 20 disposed within the cylinder 26 (e.g., engine cylinder) of the reciprocating engine 10. The cylinder 26 has an inner annular wall 28 defining a cylindrical cavity 30 (e.g., bore). The piston 20 may be defined by an axial axis or direction 34, a radial axis or direction 36, and a circumferential axis or direction 38. The piston 20 includes a top portion 40 (e.g., top land) and a top annular groove 42 (e.g., top groove or top-most groove) extending circumferentially (e.g., in the circumferential direction 38) about the piston 20. A top ring 44 (e.g., a top piston ring) may be positioned in the top groove 42.

The top ring 44 is configured to protrude radially outward from the top groove 42 to contact the inner annular wall 28 of the cylinder 26. The top ring 44 generally blocks the fuel 18 and the air 16, or a fuel-air mixture 82, from escaping from the combustion chamber 12 and/or facilitates maintenance of suitable pressure to enable the expanding hot combustion gases to cause the reciprocating motion of the piston 20. Furthermore, the top ring 44 of the present embodiments may be configured to facilitate scraping of oil, which coats the inner annular wall 28 and which controls heat and/or friction within the engine 10, for example.

In certain embodiments, the piston 20 is a steel (e.g., steel or any of a variety of steel alloys, such as 42CrMo4V or 38MnVS6) piston. In some embodiments, the piston 20 is an aluminum (e.g., aluminum or any of a variety of aluminum alloys, such as SAE332 or AlSi12CuMgNi) piston. In certain embodiments, the top groove 42 includes a protective ring insert or a ring support insert (e.g., a Ni-resist cast iron ring insert material, such as ASTM A436, Type 1) configured to support the top ring 44. The protective ring insert may be formed from an insert material that is more wear resistant, heat resistant, and/or pressure resistant that the material from which the piston 20 and/or the top ring 44 is formed. By way of another example, the insert material may be configured to withstand temperatures and/or pressures that are 5, 10, 15, 20, 25, 30, 35, 40, 60, 70, 80, 90, 100, 150, 200, 250, 300, or more percent greater than those withstood by the material from which the piston 20 and/or the top ring 44 is formed. In certain embodiments, the protective ring insert may be formed from an insert material that has a hardness that is greater (e.g., 5, 10, 15, 20, 25, 30, 35, 40, 60, 70, 80, 90, 100, 150, 200, 250, 300, or more percent greater) than the material from which the piston 20 and/or the top ring 44 is formed. For example, in some embodiments, the piston 20 may have a hardness between approximately 50-150, 60-140, or 70-130 HB, while the protective ring insert may have a hardness between approximately 80-220, 90-210, or 100-200 HB. By way of another example, in some embodiments, the piston 20 may have a hardness between approximately 90-120 HB, while the protective ring insert may have a hardness between approximately 120-190 HB. In some embodiments, the protective ring insert may be a Ni-resist ring insert that includes a nickel alloy (e.g., any of a variety of nickel alloys, such as ASTM A436, Type 1). Generally, the insert material may enable the piston assembly 25 to withstand the high pressures and/or high temperatures in large industrial engines over the long operating life of such engines.

In some embodiments, one or more additional annular grooves 50 (e.g., additional ring grooves) may extend circumferentially about the piston 20 axially below the top groove 42. In some embodiments, one or more additional rings 52 (e.g., additional rings) may be disposed within each of the one or more additional ring grooves 50. The additional rings 52 may be configured to block blowby and/or to scrape oil from the inner annular wall 28 of the cylinder 26.

As shown, the piston 20 is attached to a crankshaft 54 via a connecting rod 56 and a pin 58. The crankshaft 54 translates the reciprocating linear motion of the piston 24 into a rotating motion. As the piston 20 moves, the crankshaft 54 rotates to power the load 24 (shown in FIG. 1), as discussed above. As shown, the combustion chamber 14 is positioned adjacent to the top land 40 of the piston 24. A fuel injector 60 provides the fuel 18 to the combustion chamber 14, and a valve 62 controls the delivery of air 16 to the combustion chamber 14. An exhaust valve 64 controls discharge of exhaust from the engine 10. However, it should be understood that any suitable elements and/or techniques for providing fuel 18 and air 16 to the combustion chamber 14 and/or for discharging exhaust may be utilized. In operation, combustion of the fuel 18 with the air 16 in the combustion chamber 14 cause the piston 20 to move in a reciprocating manner (e.g., back and forth) in the axial direction 34 within the cavity 30 of the cylinder 26.

A clearance 78 (e.g., a radial clearance defining an annular space) is provided between the inner annular wall 28 of the cylinder 26 and an outer surface 80 (e.g., an annular surface) of the piston 20. As discussed above, it is desirable to maintain contact between the top ring 44 and the inner annular wall 28 of the cylinder 26 to block blowby as well as to enable the top ring 44 to scrape oil from the inner annular wall 28, for example. However, during operation of the engine 10, the combustion gases from the combustion chamber 12 contact an outer face 90 (e.g., a radially outer face or an outer circumferential face) of the top ring 44 and exert a force that drives the top ring 44 radially inward (e.g., along the radial axis 36) away from the inner wall 28 of the cylinder 26. Accordingly, present embodiments include one or more channels (e.g., passageways, troughs, grooves, or the like), such as one or more radial channels 94, configured to transfer combustion gases to a space (shown in FIG. 5) adjacent to an inner circumferential surface (shown in FIG. 5) of the top ring 44. Additionally, the one or more radial channels 94 facilitate the flow of oil out of the top groove 42 and/or block the accumulation of oil within the top groove 42. Such a configuration enables the one or more radial channels 94 to reliably balance the pressure gradient across the top ring 44 (e.g., stabilize the top ring 44) and/or enables the top ring 44 to maintain contact with the inner annular wall 28 of the cylinder 26.

FIG. 3 is a side view of a portion of an embodiment of the piston 20 having radial channels 94 formed in the top land 40 of the piston 20. As shown, the radial channels 94 are formed at discrete locations about the piston 20 (e.g., discrete locations that are spaced apart circumferentially about the piston 20). In the illustrated embodiment, the radial channels 94 have a curved cross-section (e.g., have a curved wall 98) and a radial channel radius 100. The radial channels 94 are formed into or along an axially-facing surface 102 (e.g., an annular surface), which corresponds to both a bottom surface of the top land 40 and an upper surface (e.g., top surface or a top perimeter) of the top groove 42. The radial channels 94 may extend radially inward (e.g., in the radial direction 36) from the outer surface 80 (e.g., an outer annular surface) of the top land 40 of the piston 20. As shown, the radial channels 94 are open toward the top groove 42, and an axial distance 104 between the top ring 44 and the axially-facing surface 102 is increased along the radial channels 94 (e.g., as shown by a second axial distance 103 that is greater than the axial distance 104 and coincident with the radial channels 94). Thus, the axial distance between the top ring 44 and the axially-facing surface 102 varies circumferentially about the top ring 44. As discussed in more detail below, such a configuration facilitates the flow of oil out of the top groove 42 (e.g., blocks oil from accumulating within the top groove 42), thereby enabling reliable transfer of the combustion gases from the cavity 30 along the radial channels 94 to a space (shown in FIG. 5), where the combustion gases exert a radially outward force (e.g., a pressure-induced biasing force) against an inner face (shown in FIG. 5) of the top ring 44. Accordingly, the radial channels 94 reliably control the pressure gradient across the top ring 44 and enable maintenance of contact between the top ring 44 and the inner annular wall 28 of the cylinder 26. The radial channels 94 may help equalize the pressures axially above a sealing point 107, while generating a positive pressure differential axially below the sealing point 107 to urge the top ring 44 radially outward against the inner annular wall 28 of the cylinder 26.

In some cases, the radial channel radius 100 may be greater than approximately 2 millimeters (mm). In some cases, the radial channel radius 100 may be greater than approximately 0.5 mm, 1 mm, 1.5 mm, 2.5 mm, or 3 mm, for example. Additionally, the radial channel radius 100 may be less than 10, 20, 30, 40, 50, 60, 70, 80, or 90 percent of the axial distance 103. The radial channel radius 100 may be between 10-90, 20-80, 30-70, or 40-60 percent of the axial distance 103. In some embodiments having the protective ring insert, the radial channel radius 100 may be less than 10, 20, 30, 40, 50, 60, 70, 80, or 90 percent of an axial height of the protective ring insert. The radial channel radius 100 may be between 10-90, 20-80, 30-70, or 40-60 percent of the axial height of the protective ring insert. Although the radial channels 94 are shown as having a curved cross-section, it should be understood that the radial channels 94 may have any suitable cross-section (e.g., rectangular, triangular, curved with varying curvature, or the like) or configuration that facilitates transfer of the combustion gases in the manner disclosed herein. Furthermore, although multiple radial channels 94 are illustrated, it should be understood that any suitable number of radial channels 94 may be provided, such as 1, 2, 3, 4, 5, 6, 7, 8, 9, 10, or more. Additionally, the radial channels 94 may be distributed in any suitable manner, including with a uniform circumferential spacing about the piston 20.

Figure 4:
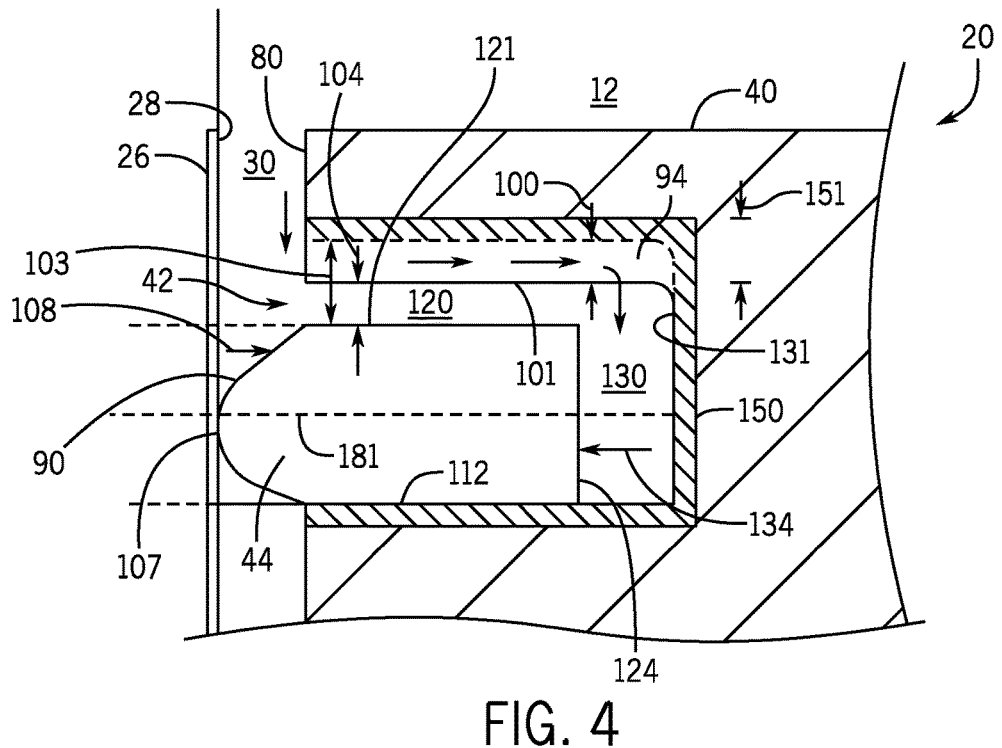
FIG. 4 is a cross-sectional side view of a portion of an embodiment of a piston having radial channels formed in a top land of the piston.

FIG. 4 is a side cross-sectional view of a portion of an embodiment of the piston 20 having the top ring 44 and one radial channel 94 formed in the top land 40 of the piston 20. In the illustrated embodiments, the radial channel 94 is formed in the axially-facing surface 102. The radial channels 94 extend radially inwardly (e.g., along the radial axis 36) from the outer surface 80 of the top land 40. During operation of the engine 10, combustion gases exert pressure on the outer face 90 of the top ring 44 and generate a radially inward force 108 that drives the top ring 44 away from the inner annular wall 28 of the cylinder 26.

Although a gap 120 (e.g., a top groove clearance) is provided between a top face 121 (e.g., an axially upper face) of the top ring 44 and the axially-facing surface 102 of the piston 20 to enable some combustion gases to flow within the top groove 42, the first axial distance 102 across the gap 120 is desirably configured to minimize ring lift and flutter. Thus, without the disclosed embodiments oil may accumulate in the relatively small gap 120 and block the flow of combustion gases through the top groove 42, and the gap 120 may not enable efficient, reliable transfer of the combustion gases to an inner face 124 (e.g., a radially inner face or an inner circumferential face) of the top ring 44, if the gap 120 is blocked with oil. Accordingly, without the disclosed radial channels 94, oil may accumulate in the top groove 42 and a large pressure differential may exist across the top ring 44 (e.g., between the outer face 90 and the inner face 124), if the gap 120 is blocked with oil. For example, without the disclosed radial channels 94, oil may adhere to the top groove 42 and block the flow of combustion gases, and thus, the pressure adjacent to the outer face 90 may be greater than the pressure adjacent to the inner face 124. In such cases, the top ring 44 may be susceptible to radial ring collapse, which in turn results in increased oil consumption and blowby, for example.

In the present embodiments, the radial channels 94 may be configured to facilitate transfer of the combustion gases to a space 130 (e.g., an annular space) adjacent to the inner face 124 of the top ring 44 and an inner wall 131 (e.g., an inner annular wall) of the top groove 42, which may provide increased stability of the top ring 44. The combustion gases in the space 130 may exert a radially-outward force 134 to balance or to counter the radially-inward force 108, and the pressure across the top ring 44 may be substantially equal or otherwise controlled to block radial ring collapse and to maintain contact between the top ring 44 and the inner annular wall 28 of the cylinder 26, for example.

Additionally, as shown, the outer surface 90 of the top ring 44 is configured to contact the inner annular wall 28 to form the sealing point 107. Such a configuration may advantageously enable the top ring 44 to scrape oil from the inner annular wall 28 of the cylinder 26 during operation of the engine 10. Additionally, oil is generally a viscous and adhesive liquid that may adhere to the piston 20, including the top groove 42, in certain circumstances. The radial channels 94 provide the larger axial distance 103 and overall larger crevice volume between the top ring 44 and the axially-facing surface 102, as well as lower surface area to volume ratio. Such a configuration may reduce adhesion and generally facilitate flow of the oil out of the top groove 42 (e.g., into the combustion chamber 12 or along the inner annular wall 28 of the cylinder 26) and therefore, may improve oil control and reduce oil consumption within the engine 10.

As noted above, in some embodiments, the piston 20 is a steel piston. In certain embodiments, the piston 20 is an aluminum piston. The piston 20 may optionally include a protective ring insert or a ring support insert 150 (e.g., an Ni-resist ring insert) surrounding the top groove 42 (e.g., lining the top groove 42 and extending circumferentially about the piston 20). The protective ring insert 150 may extend along all or part of the top ring groove 42 (e.g., the axially-facing surface 102, the inner wall 131, and/or a bottom axially-facing surface 112). For example, in the illustrated cross-section, the protective ring insert 150 has a generally C-shape or U-shape.

As noted above, the protective ring insert 150 may be formed from an insert material that is more wear resistant, heat resistant, and/or pressure resistant that the material from which the piston 20 is formed. For example, the insert material may be configured to withstand temperatures and/or pressures that are 5, 10, 15, 20, 25, 30, 35, 40, 60, 70, 80, 90, 100, 150, 200, 250, 300, or more percent greater than those withstood by the material from which the piston 20 and/or the top ring 44 is formed. In certain embodiments, the protective ring insert 150 may be formed from an insert material that has a hardness that is greater (e.g., 5, 10, 15, 20, 25, 30, 35, 40, 60, 70, 80, 90, 100, 150, 200, 250, 300, or more percent greater) than the material from which the piston 20 and/or the top ring 44 is formed. As discussed in more detail below, in some embodiments, the protective ring insert 150 may be a Ni-resist ring insert that includes a nickel alloy (e.g., any of a variety of nickel alloys, such as ASTM A436, Type 1). Generally, the insert material may enable the piston 20 to withstand the high pressures and/or high temperatures in large industrial engines over the long operating life of such engines.

The protective ring insert 150 may be cast into the top ring groove 42 and may be configured to support the top ring 44. In other embodiments, the protective ring insert 150 may be installed in segments and joined together in the top ring groove 42 (e.g., via welding, brazing, or the like). In other embodiments, the protective ring insert 150 may be installed via application of a coating (e.g., a spray coating) or any other suitable technique. In some embodiments, the protective ring insert 150 may comprise a nickel alloy (e.g., any of a variety of nickel alloys) and may be configured to withstand the high pressures and/or high temperatures within the engine 10.

In embodiments having the protective ring insert 150, the radial channels 94 may be formed within the protective ring insert 150 (e.g., an axially facing surface of the protective ring insert 150), as shown. As noted above, in certain embodiments having the protective ring insert 150, the radial channel radius 100 may be less than 10, 20, 30, 40, 50, 60, 70, 80, or 90 percent of an axial height 151 of the protective ring insert. The radial channel radius 100 may be between 10-90, 20-80, 30-70, or 40-60 percent of the axial height 151 of the protective ring insert. In some embodiments, the radial channels 94 in the protective ring insert 150 may advantageously enable installation of the radial channels 94 into a simple annular groove rather than via formation of the radial channels 94 directly in the piston 20 itself. Additionally, various protective ring inserts 150 (e.g., having various configurations, numbers, and/or sizes of radial channels 94) may be inserted into any of a variety of pistons having a corresponding groove configured to receive such protective ring inserts 150. Thus, the protective ring insert 150 could be utilized to tailor the groove (e.g., the top ring groove 42) to have a suitable configuration, number, and/or size of radial channels 94 (e.g., a family of different protective ring inserts 150 could be selective utilized with the piston 20).

Figure 5:
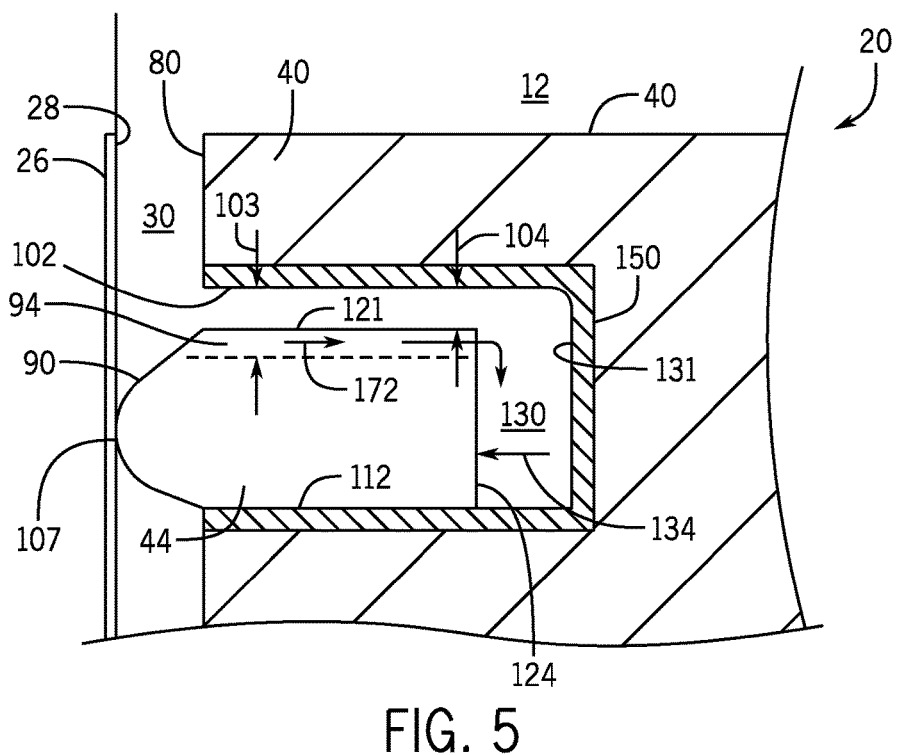
FIG. 5 is a cross-sectional side view of a portion of an embodiment of a piston having radial channels formed in a top piston ring.

FIG. 5 illustrates a side cross-sectional view of a portion of an embodiment of the piston 20 having one radial channel 94 formed in the top ring 44. In certain embodiments, radial channels 94 may be formed along the top face 121 of the top ring 44. Such channels may be provided in addition to or as an alternative to the radial channels 94 formed in the top land 40 of the piston 20, as shown in FIGS. 2-4, for example.

As shown, the radial channels 94 formed in the top ring 44 may extend radially inward (e.g., in the radial direction 36) from the outer face 90 to the inner face 124 of the top ring 44. The radial channels 94 may increase the axial distance 104 between the top face 121 of the top ring 44 and the axially-facing surface 102 of the top groove 42 along the radius 100 coincident with the radial channel 94. Thus, the radial channel 94 may facilitate flow of oil out of the top groove 42, thereby enabling reliable flow of the combustion gases from the cavity 30 to the space 130 adjacent to the inner face 124, as shown by arrow 172. As discussed above, the transfer of gases to the space 130 may control the pressure differential between the annular outer face 90 and the inner face 124 of the top ring 44, and thus enable the top ring 44 to maintain contact with the inner wall 28 of the cylinder 26.

As set forth above, the radial channels 94 may help to equalize pressures or create pressure differential between the inner face 124 of the top ring 44 and the outer face 90 of the top ring 44, thereby helping to bias the top ring 44 radially-outward against the cylinder 26 to block radial ring collapse and/or blowby, for example. Additionally, the top ring 44 and/or the radial channels 94 may be constructed to block radial ring collapse and blowby, while also providing oil control within the engine 10. As noted above, in some embodiments, the piston 20 is a steel piston. In certain embodiments, the piston 20 is an aluminum piston. The piston 20 may optionally include the protective ring support insert 150 having any of the features set forth above.

Technical effects of the disclosed embodiments include providing systems for controlling the flow of oil and/or the distribution of combustion gases within the engine 10 via channels, such as radial channels 94. For example, the combustion gases may exert pressure against the outer face 90 of the top ring 44 of the piston assembly. Radial channels 94 formed in the top land 40 or in the top ring 44 may transfer the combustion gases to the space 130 adjacent to the inner surface 124 of the top ring 44, thus controlling a pressure gradient between the outer face 90 and the inner face 124 and enabling the top ring 44 to maintain contact with the inner wall 28 of the cylinder 26. Such configurations may also advantageously limit oil in proximity to the radial channels 94, thus providing reliable, durable transfer of combustion gases through the radial channels 94. The disclosed embodiments may advantageously reduce oil consumption, emissions, blowby, radial ring collapse, and/or friction within the engine 10, for example.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A power cylinder system for a reciprocating engine, comprising:
   a steel piston comprising a diameter greater than ten centimeters and configured to move within a cylinder of the reciprocating engine configured to operate at a maximum revolutions per minute (RPM) of approximately 1800 RPM;
   a groove extending circumferentially about the steel piston beneath a top land of the steel piston and configured to support a ring having an inner circumferential face; and
   one or more channels formed in the top land and configured to facilitate transfer of combustion gases to a space between a portion of the groove and the inner circumferential face of the ring,
      wherein at least one of the one or more channels comprises a curved cross-sectional shape.

2. The power cylinder system of claim 1, wherein the steel piston is configured to have a maximum mean piston speed less than eighteen meters per second.

3. The power cylinder system of claim 1, wherein the one or more channels comprise a radius greater than one millimeter.

4. The power cylinder system of claim 1, wherein the one or more channels extend radially in an axially-facing upper surface of the groove.

5. A system, comprising:
a power cylinder system for a reciprocating engine, comprising:
a piston comprising a diameter greater than ten centimeters and configured to move within a cylinder of the reciprocating engine with a maximum mean piston speed of less than approximately eighteen meters per second;
a groove extending circumferentially about the piston beneath a top land of the piston;
a ring disposed within the groove; and
one or more channels formed in an axially upper surface of the groove or an upper face of the ring, wherein the one or more channels are configured to facilitate transfer of combustion gases to a space between a portion of the groove and an inner circumferential face of the ring,
wherein at least one of the one or more channels comprises a curved cross-sectional shape.

6. The system of claim 5, wherein the piston is a steel piston.

7. The system of claim 5, wherein the piston is an aluminum piston and the groove comprises a protective ring insert configured to support the ring.

8. The system of claim 7, wherein the protective ring insert comprises a Ni-resist ring insert.

9. The system of claim 7, wherein the one or more channels are formed within the protective ring insert of the groove.

10. The system of claim 5, wherein the one or more channels comprise a radius greater than one millimeter.

11. The system of claim 5, comprising the reciprocating engine configured to operate with the maximum mean piston speed of less than approximately eighteen meters per second.

12. The system of claim 11, wherein the reciprocating engine comprises an industrial power-generating engine and is configured to remain stationary relative to a ground during operation.

13. A method of operating a reciprocating engine, comprising:
operating the reciprocating engine with a maximum mean piston speed of less than approximately eighteen meters per second, wherein the reciprocating engine comprises a piston comprising a diameter greater than ten centimeters and configured to move within a cylinder of the reciprocating engine; and
transferring combustion gases through one or more channels to a space between a portion of a groove extending circumferentially about the piston beneath a top land of the piston and an inner circumferential face of a ring disposed within the groove, wherein the one or more channels are formed in an axially upper surface of the groove or an upper face of the ring,
wherein at least one of the one or more channels comprises a curved cross-sectional shape.

14. The method of claim 13, wherein the piston is a steel piston.

15. The method of claim 13, wherein the piston is an aluminum piston and the groove comprises a protective ring insert configured to support the ring, and wherein the one or more channels are formed within the protective ring insert of the groove.

16. The method of claim 13, comprising operating the reciprocating engine at a maximum revolutions per minute (RPM) of approximately 1800 RPM.

* * * * *